(12) United States Patent
Nakatsuka et al.

(10) Patent No.: US 9,614,555 B2
(45) Date of Patent: Apr. 4, 2017

(54) AC COUPLED TRANSMISSION CIRCUIT AND SYSTEM

(71) Applicant: Kabushiki Kaisha Toshiba, Minato-ku, Tokyo (JP)

(72) Inventors: Shinji Nakatsuka, Kanagawa (JP); Shinsuke Fujii, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/845,324

(22) Filed: Sep. 4, 2015

(65) Prior Publication Data

US 2016/0218755 A1  Jul. 28, 2016

(30) Foreign Application Priority Data

Jan. 28, 2015  (JP) .................................. 2015-014694

(51) Int. Cl.
| | |
|---|---|
| H04B 1/04 | (2006.01) |
| H04B 5/00 | (2006.01) |
| H01F 38/14 | (2006.01) |
| H04L 25/49 | (2006.01) |
| H04L 25/02 | (2006.01) |
| H04B 1/16 | (2006.01) |

(52) U.S. Cl.
CPC ............ H04B 1/0475 (2013.01); H01F 38/14 (2013.01); H04B 5/0075 (2013.01); H04L 25/0272 (2013.01); H04L 25/4902 (2013.01); H04B 1/16 (2013.01)

(58) Field of Classification Search
CPC ......... H01F 38/14; H01F 38/143; H04B 3/54; H04B 1/7073; H04B 1/0475; H04B 5/0075; H04L 25/0272; H04L 25/4902
See application file for complete search history.

(56) References Cited

U.S. PATENT DOCUMENTS 4,654,880 A * 3/1987 Sontag .................... H04B 5/02
455/121
8,681,882 B2    3/2014 Yamasaki
(Continued)

FOREIGN PATENT DOCUMENTS

JP        03-085040       4/1991
JP        2723991 B2      3/1998
(Continued)

*Primary Examiner* — Michelle M Koeth
(74) *Attorney, Agent, or Firm* — White & Case LLP

(57) ABSTRACT

According to an embodiment, a transmission circuit is configured to transmit a signal to a reception circuit through a transmitting AC coupling element. The transmitting AC coupling element is AC coupled to a receiving AC coupling element. The transmission circuit includes a drive signal generation circuit and a drive circuit. The drive signal generation circuit is configured to generate a drive signal in synchronization with a transmission signal to be transmitted. The drive circuit is configured to cause, in response to the drive signal, a drive current to flow between both ends of the transmitting AC coupling element in synchronization with a rising edge and a falling edge of the transmission signal during a driving period set in advance. The drive circuit is configured to apply an applied voltage to both of the ends of the transmitting AC coupling element after the driving period.

20 Claims, 17 Drawing Sheets

13D

(56) References Cited

U.S. PATENT DOCUMENTS

| | | | |
|---|---|---|---|
| 2012/0007438 A1* | 1/2012 | Kuroda | H04L 25/0266 307/104 |
| 2012/0275527 A1* | 11/2012 | Douglass | H04L 25/0278 375/257 |
| 2014/0084857 A1* | 3/2014 | Liu | H02J 7/025 320/108 |
| 2015/0349539 A1* | 12/2015 | Moyer | H04B 15/02 307/104 |

FOREIGN PATENT DOCUMENTS

| | | |
|---|---|---|
| JP | 2000-036844 A | 2/2000 |
| JP | 3570897 B2 | 9/2004 |
| JP | 2005-348264 A | 12/2005 |

\* cited by examiner (FIRST COMPARATIVE EXAMPLE)

(SECOND COMPARATIVE EXAMPLE)

AC COUPLED TRANSMISSION CIRCUIT AND SYSTEM

CROSS REFERENCE TO RELATED APPLICATION

This application is based upon and claims the benefit of priority from the prior Japanese Patent Application No. 2015-014694 filed on Jan. 28, 2015 in Japan, the entire contents of which are incorporated herein by reference.

FIELD

Embodiments described herein relate generally to a transmission circuit and a communication system.

BACKGROUND

A communication system including a transmission circuit, which transmits a signal through a transmission inductor, and a reception circuit, which receives a signal through a reception inductor inductively coupled to the transmission inductor, is known. The reception circuit restores, from the received signal, a transmitted original data pattern.

In this communication system, it is preferable to reduce the power consumption of the transmission circuit while suppressing deterioration in waveform quality of a reception signal.

DETAILED DESCRIPTION

According to an embodiment, a transmission circuit is configured to transmit a signal to a reception circuit through a transmitting AC coupling element. The reception circuit receives a signal through a receiving AC coupling element. The transmitting AC coupling element is AC coupled to the receiving AC coupling element. The transmission circuit includes a drive signal generation circuit and a drive circuit. The drive signal generation circuit is configured to generate a drive signal in synchronization with a transmission signal to be transmitted. The drive circuit is configured to cause, in response to the drive signal, a drive current to flow between both ends of the transmitting AC coupling element in synchronization with a rising edge and a falling edge of the transmission signal during a driving period set in advance. The drive circuit is configured to apply an applied voltage to both of the ends of the transmitting AC coupling element after the driving period.

Embodiments will now be explained with reference to the accompanying drawings.

First Embodiment

Figure 1:
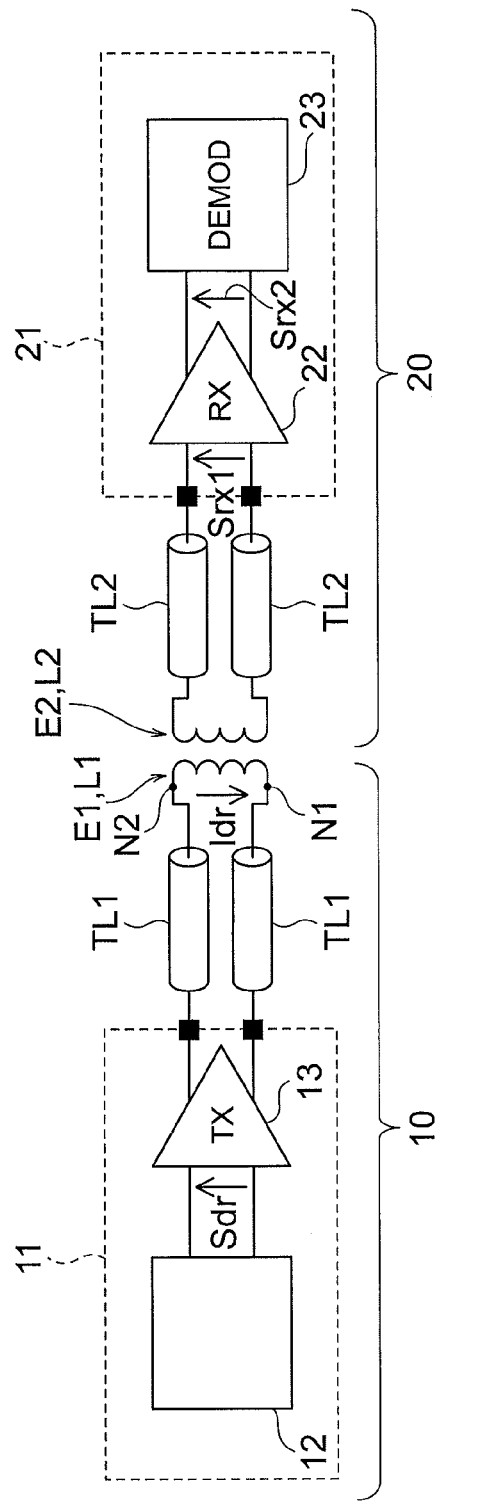
FIG. 1 is a block diagram illustrating a schematic configuration of a communication system according to a first embodiment.

FIG. 1 is a block diagram illustrating a schematic configuration of a communication system according to a first embodiment. As illustrated in FIG. 1, a communication system 1 includes a transmitter 10 and a receiver 20. The transmitter 10 and the receiver 20 perform contactless communication using AC coupling. Here, an example in which inductive coupling is used as the AC coupling will be described.

The transmitter 10 includes a transmitting AC coupling element E1, a pair of first transmission lines TL1 and TL1, and a transmission circuit 11. The transmitting AC coupling element E1 is a transmission inductor L1. The transmission inductor L1, and the first transmission lines TL1 and TL1, and the transmission circuit 11 are provided, for example, on a printed wiring board of the transmitter 10. The transmission inductor L1 is, for example, a planar inductor.

The first transmission lines TL1 and TL1 are, for example, a microstrip line or the like and connect the transmission circuit 11 and both ends N1 and N2 of the transmission inductor L1.

The transmission circuit 11 transmits, to a reception circuit 21 of the receiver 20, a differential signal in response to a transmission signal Stx to be transmitted, through the first transmission lines TL1 and TL1 and the transmission inductor L1. Hereinafter, the differential signal will be described, and the signal may be a single phase (single end) signal.

The transmission circuit 11 includes a drive signal generation circuit 12 and a drive circuit 13. The drive signal generation circuit 12 generates a drive signal Sdr in synchronization with the transmission signal Stx to be transmitted. The transmission signal Stx is modulated by a predetermined modulation method. The transmission signal Stx may be supplied from outside to the drive signal generation circuit 12, or may be generated inside the drive signal generation circuit 12 which functions as a modulator.

The drive circuit 13 causes, in response to the drive signal Sdr, a drive current Idr to flow between both of the ends N1 and N2 of the transmission inductor L1 in synchronization with a rising edge and a falling edge of the transmission signal Stx during a driving period Tdr set in advance. The drive circuit 13 applies, after the driving period Tdr, an applied voltage to both of the ends N1 and N2 of the transmission inductor L1.

The receiver 20 includes, a receiving AC coupling element E2, a pair of second transmission lines TL2 and TL2, and the reception circuit 21. The receiving AC coupling element E2 is a reception inductor L2. The reception inductor L2, the second transmission lines TL2 and TL2, and the reception circuit 21 are provided, for example, on a printed wiring board of the receiver 20. The reception inductor L2 is, for example, a planar inductor.

The transmitter 10 and the receiver 20 are adjacently arranged so that the transmission inductor L1 is adjacent to the reception inductor L2 when the communication is performed. The distance between the transmission inductor L1 and the reception inductor L2 is, for example, several hundreds μm. With this arrangement, the reception inductor L2 is inductively coupled (AC coupled) to the transmission inductor L1. Thus, the signal is transmitted from the transmission inductor L1 to the reception inductor L2 by electromagnetic induction.

The second transmission lines TL2 and TL2 are, for example, a microstrip line or the like and connect both ends of the reception inductor L2 and the reception circuit 21.

The reception circuit 21 receives, through the reception inductor L2 and the second transmission lines TL2 and TL2, a differential first reception signal Srx1 in response to the transmitted signal.

The reception circuit 21 includes a hysteresis circuit (hysteresis buffer) 22 and a demodulator 23. The hysteresis circuit 22 has a hysteresis in input/output characteristics and outputs a second reception signal Srx2 in response to the first reception signal Srx1. More specifically, the hysteresis circuit 22 outputs the high level ("H") second reception signal Srx2 when the first reception signal Srx1 has changed to a positive first threshold voltage or higher, and outputs the low level ("L") second reception signal Srx2 when the first reception signal Srx1 has changed to a negative second threshold voltage or lower.

The demodulator 23 demodulates, by a method corresponding to the modulation method, the reception data based on the second reception signal Srx2.

Figure 2:
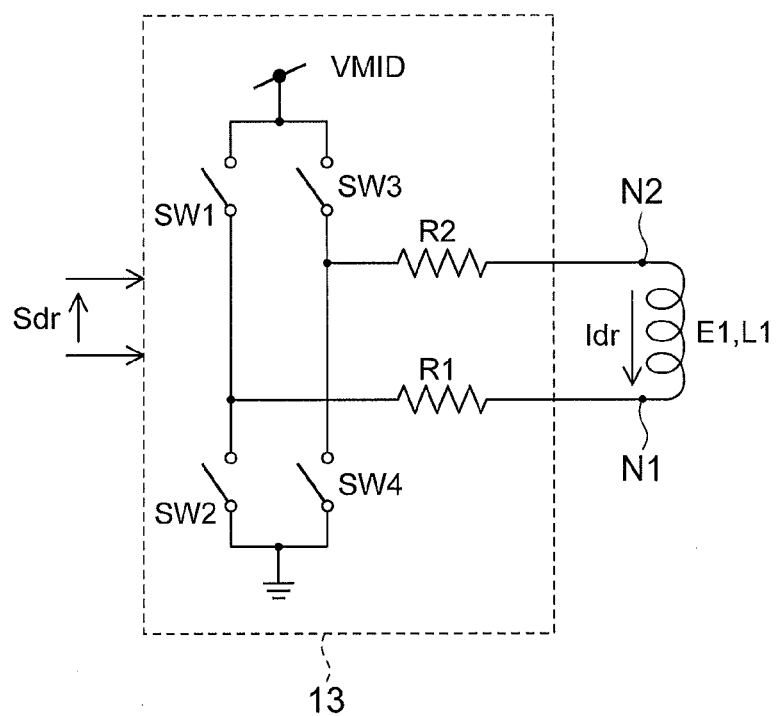
FIG. 2 is a circuit diagram illustrating a configuration of a drive circuit of the communication system of FIG. 1.

FIG. 2 is a circuit diagram illustrating a configuration of the drive circuit 13 of the communication system 1 of FIG. 1. As illustrated in FIG. 2, the drive circuit 13 includes a first switching element SW1, a second switching element SW2, a third switching element SW3, a fourth switching element SW4, a resistor (fifth impedance element) R1, and a resistor (sixth impedance element) R2.

As the first to fourth switching element SW1 to SW4, for example, a transistor, such as an NMOS transistor, may be used.

The first switching element SW1 includes one end, to which a drive voltage (first voltage) VMID is supplied, and the other end connected to one end N1 of the transmission inductor L1 through the resistor R1.

The second switching element SW2 includes one end, to which a ground voltage (second voltage) is supplied, and the other end connected to the one end N1 of the transmission inductor L1 through the resistor R1.

The third switching element SW3 includes one end, to which the drive voltage VMID is supplied, and the other end connected to the other end N2 of the transmission inductor L1 through the resistor R2.

The fourth switching element SW4 includes one end, to which the ground voltage is supplied, and the other end connected to the other end N2 of the transmission inductor L1 through the resistor R2.

In other words, the resistor R1 is connected between the one end N1 of the transmission inductor L1, and a connection node of the other end of the first switching element SW1 and the other end of the second switching element SW2. The resistor R2 is connected between the other end N2 of the transmission inductor L1, and a connection node of the other end of the third switching element SW3 and the other end of the fourth switching element SW4. The resistors R1 and R2 determine an output impedance of the drive circuit 13.

The drive signal generation circuit 12 makes the first and fourth switching elements SW1 and SW4, or the second and third switching elements SW2 and SW3 conductive during the driving period Tdr, and causes the drive current Idr to flow. Then, after the driving period Tdr has passed, the drive signal generation circuit 12 makes the second and fourth switching elements SW2 and SW4 conductive, and applies an applied voltage to both of the ends N1 and N2 of the transmission inductor L1. The applied voltage is the ground voltage.

Figure 3:
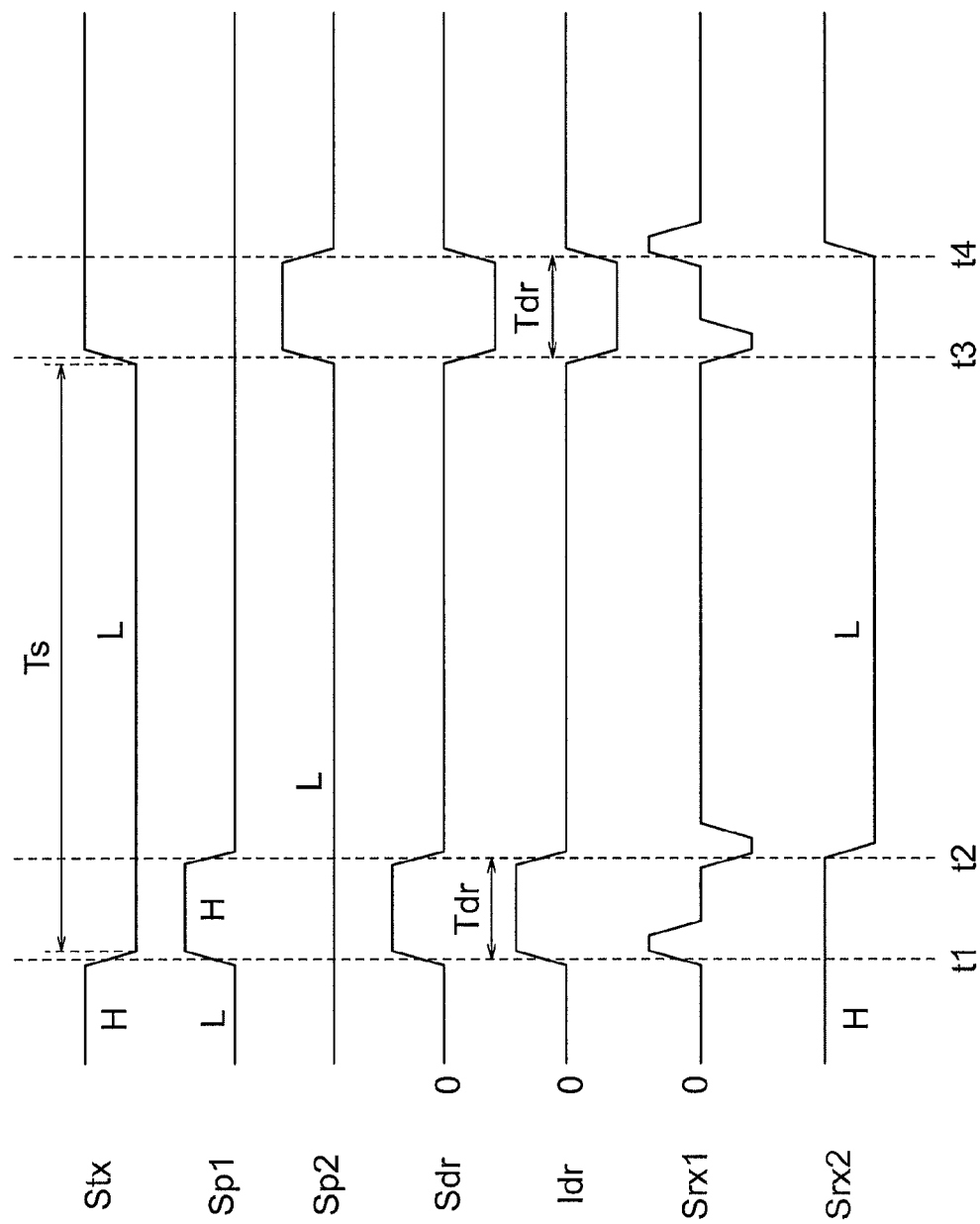
FIG. 3 is a timing chart of the communication system of FIG. 1.

FIG. 3 is a timing chart of the communication system 1 of FIG. 1. In an example illustrated in FIG. 3, the transmission signal Stx changes from "H" to "L" at time t1 and changes from "L" to "H" at time t3.

The drive signal generation circuit 12 generates, as an internal signal, a pulse signal Sp1 which becomes "H" during the driving period Tdr in synchronization with the falling edge of the transmission signal Stx at time t1. The pulse signal Sp1 becomes "H" during the period from time t1 to t2.

The drive signal generation circuit 12 generates, in response to the pulse signal Sp1, the drive signal Sdr which becomes a predetermined positive voltage during the period from time t1 to t2.

The drive circuit 13 is configured so that the second and third switching elements SW2 and SW3 become conductive and the first and fourth switching elements SW1 and SW4 become non-conductive when the drive signal Sdr is positive.

Thus, during the period from time t1 to t2, the second and third switching elements SW2 and SW3 are conductive and the first and fourth switching elements SW1 and SW4 are non-conductive, and the positive drive current Idr flows through the transmission inductor L1 during the driving period Tdr.

Therefore, as the first reception signal Srx1, a positive pulse is generated at time t1, and a negative pulse is generated at time t2.

Thus, the second reception signal Srx2 which is "H" before time t1 does not change at time t1, and changes to "L" at time t2.

For example, when the communication is started from time t1, the logic of the initial value of the transmission signal Stx at the start of communication is "L", and the logic of the second reception signal Srx2 is set to "H" during standby until time t1. Thus, it is possible to receive the initial value "L" of the transmission signal Stx. In other words, the logic of the second reception signal Srx2 during the standby is different from the logic of the initial value of the transmission signal Stx.

On the other hand, when the logic of the initial value of the transmission signal Stx is "L" and the logic of the second reception signal Srx2 during the standby until time t1 is "L", that is, when these logics are the same, the second reception signal Srx2 becomes "H" at time t1 and becomes "L" at time t2. Therefore, "H" which is different from the initial value "L" of the transmission signal Stx is received, and it makes erroneous reception.

During the period from time t2 to t3, the drive signal Sdr is 0 V. The drive circuit 13 is configured so that the second and fourth switching elements SW2 and SW4 become conductive and the first and third switching elements SW1 and SW3 become non-conductive when the drive signal Sdr is 0 V. Thus, during the period from time t2 to t3, the second and fourth switching elements SW2 and SW4 are conductive and the first and third switching elements SW1 and SW3 are non-conductive. Thus, the ground voltage is applied to both of the ends N1 and N2 of the transmission inductor L1 as the applied voltage.

Therefore, the drive current Idr is 0 A. Therefore, the first reception signal Srx1 does not change, and the second reception signal Srx2 neither changes.

Next, at time t3, the drive signal generation circuit 12 generates, as an internal signal, a pulse signal Sp2 which becomes "H" during the driving period Tdr in synchronization with the rising edge of the transmission signal Stx at time t3. The pulse signal Sp2 becomes "H" during the period from time t3 to time t4.

The drive signal generation circuit 12 generates, in response to the pulse signal Sp2, the drive signal Sdr which becomes a predetermined negative voltage during the period from time t3 to t4.

The drive circuit 13 is configured so that the first and fourth switching elements SW1 and SW4 become conductive and the second and third switching elements SW2 and SW3 become non-conductive when the drive signal Sdr is negative.

Thus, during the period from time t3 to t4, the first and fourth switching elements SW1 and SW4 are conductive and the second and third switching elements SW2 and SW3 are non-conductive, and the negative drive current Idr flows through the transmission inductor L1 during the driving period Tdr. In other words, the drive circuit 13 makes the direction of the drive current Idr based on the rising edge of the transmission signal Stx opposite to the direction of the drive current Idr based on the falling edge of the transmission signal Stx.

Therefore, as the first reception signal Srx1, the negative pulse is generated at time t3, and the positive pulse is generated at time t4.

Thus, the second reception signal Srx2 which is "L" after time t2 does not change at time t3, and changes to "H" at time t4. That is, the hysteresis circuit 22 changes the logic of the second reception signal Srx2 in synchronization with the timing when the drive current Idr changes to zero.

After time t4, the drive signal Sdr is 0 V, the second and fourth switching elements SW2 and SW4 are conductive, and the first and third switching elements SW1 and SW3 are non-conductive. Thus, the ground voltage is applied to both of the ends N1 and N2 of the transmission inductor L1 as the applied voltage.

Therefore, the drive current Idr is 0 A, the first reception signal Srx1 does not change, and the second reception signal Srx2 neither changes.

In this manner, in the reception circuit 21, it is possible to obtain the second reception signal Srx2 equivalent to the transmission signal Stx.

Furthermore, the driving period Tdr is shorter than the minimum period of a signal level holding period Ts of the transmission signal Stx. The signal level holding period Ts represents the period in which the signal level ("H" or "L") is fixed. Therefore, in the signal level holding period Ts of the transmission signal Stx, the drive current Idr does not flow during the period other than the driving period Tdr (for example, from time t2 to t3). Therefore, it is possible to reduce the power consumption of the transmission circuit 11.

Here, a communication system of a first comparative example will be described. In the communication system of the first comparative example, the basic configuration is similar to FIG. 1, but the function of the drive signal generation circuit 12 is different.

Figure 4:
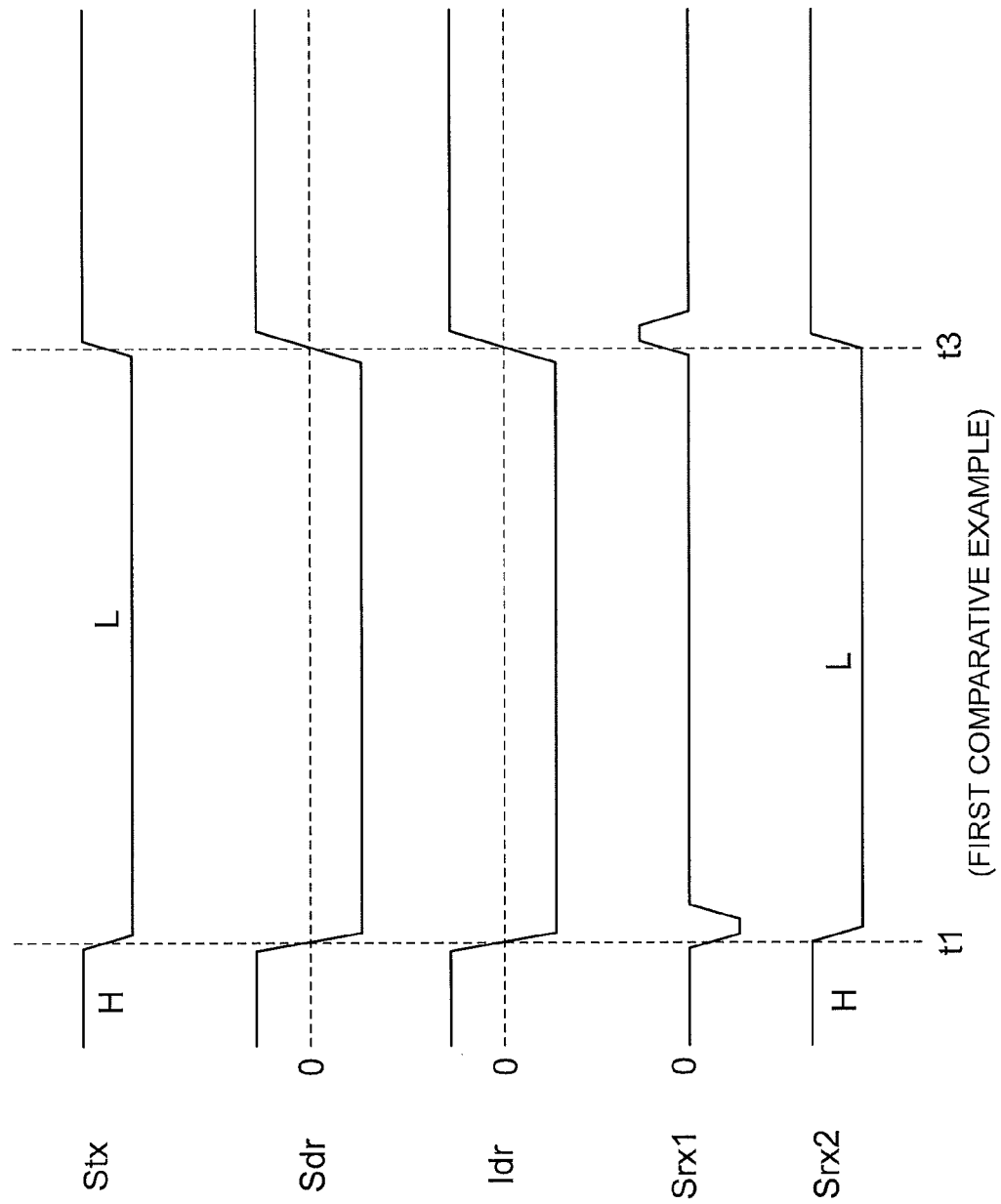
FIG. 4 is a timing chart of a communication system of a first comparative example.

FIG. 4 is a timing chart of the communication system of the first comparative example. In FIGS. 3 and 4, the transmission signal Stx is the same signal.

The drive signal Sdr becomes a predetermined positive voltage until time t1 where the transmission signal Stx is "H", and becomes a predetermined negative voltage during the period from time t1 to t3 where the transmission signal Stx is "L", and becomes the predetermined positive voltage after time t3 where the transmission signal Stx is "H".

Thus, through the transmission inductor L1, the positive drive current Idr flows until time t1, the negative drive current Idr flows during the period from time t1 to t3, and the positive drive current Idr flows after time t3.

Therefore, as the first reception signal Srx1, the negative pulse is generated at time t1, and the positive pulse is generated at time t3.

Thus, the second reception signal Srx2 changes from "H" to "L" at time t1, and changes to "H" at time t3.

In this manner, in the communication system of the first comparative example, it is possible to obtain the second reception signal Srx2 equivalent to the transmission signal Stx. However, the positive or negative drive current Idr continuously flows through the transmission inductor L1. Therefore, in the communication system of the first comparative example, the power consumption is larger than the first embodiment.

Next, a communication system of a second comparative example will be described. The communication system of the second comparative example operates at the same timing as FIG. 3, but the control of the first to fourth switching elements SW1 to SW4 is different after the driving period Tdr.

Figure 5:
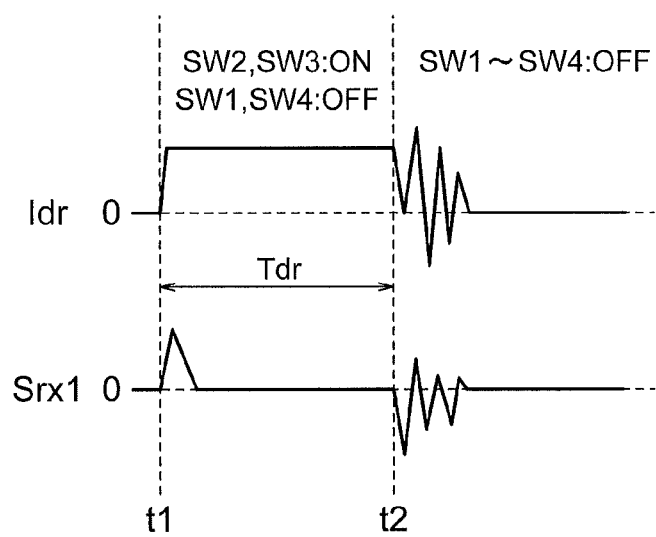
FIG. 5 is a timing chart of a communication system of a second comparative example.

FIG. 5 is a timing chart of the communication system of the second comparative example. FIG. 5 illustrates in the vicinity of times t1 and t2 of FIG. 3. The second and third switching elements SW2 and SW3 are conductive during the period from t1 to t2, and the first to fourth switching elements SW1 to SW4 are non-conductive after time t2. Thus, it is expected that the drive current Idr becomes zero. However, in practice, since there exists a parasitic capacitance in each of both of the ends N1 and N2 of the transmission inductor L1, both of the ends N1 and N2 of the transmission inductor L1 are in a floating state, and thereby resonance is caused by the above parasitic capacitance and the transmission inductor L1. Furthermore, multiple reflection is also caused. Therefore, after time t2, ringing occurs in the drive current Idr.

Thus, the ringing also occurs in the first reception signal Srx1, and the waveform quality is deteriorated. Therefore, there is a high possibility that the correct second reception signal Srx2 cannot be obtained.

In contrast, in the present embodiment, since without making the first to fourth switching elements SW1 to SW4 non-conductive after the driving period Tdr, the second and fourth switching elements SW2 and SW4 are made conductive, the voltage at both of the ends of the transmission inductor L1 is fixed to the ground voltage. Thus, as illustrated in FIG. 3, it is possible to suppress the ringing of the drive current Idr. Therefore, it is possible to suppress the deterioration of the waveform quality of the first reception signal Srx1 and obtain the correct second reception signal Srx2.

Incidentally, in the communication system 1 of the first embodiment, the communication system is not particularly limited. For example, the transmission signal Stx may be an asynchronous pulse width modulation (PWM) signal, an asynchronous trigger signal, or a non return to zero (NRZ) signal in the synchronous communication system. When the transmission signal Stx having a long term of "H" or "L" is transmitted, the reduction effect on the power consumption is improved. That is, since the drive current Idr flows during the driving period Tdr in synchronization with the rising edge and the falling edge of the transmission signal Stx, the period where the drive current Idr does not flow is relatively long in the case of the transmission signal Stx having a long term of "H" or the like. On the other hand, in the case of the transmission signal Stx having a short term of "H", the drive current Idr frequently flows, and the period where the drive current Idr does not flow is relatively short.

Note that, when the synchronous communication system is used, the clock-data-recovery technique may be used and a clock signal transmission path to transmit a clock signal for synchronization may be added between the transmitter 10 and the receiver 20. The clock signal transmission path may be configured with the AC coupling or with a cable.

Next, as an example, the communication system 1 using the PWM signal will be described with reference to FIGS. 6 and 7.

Figure 6:
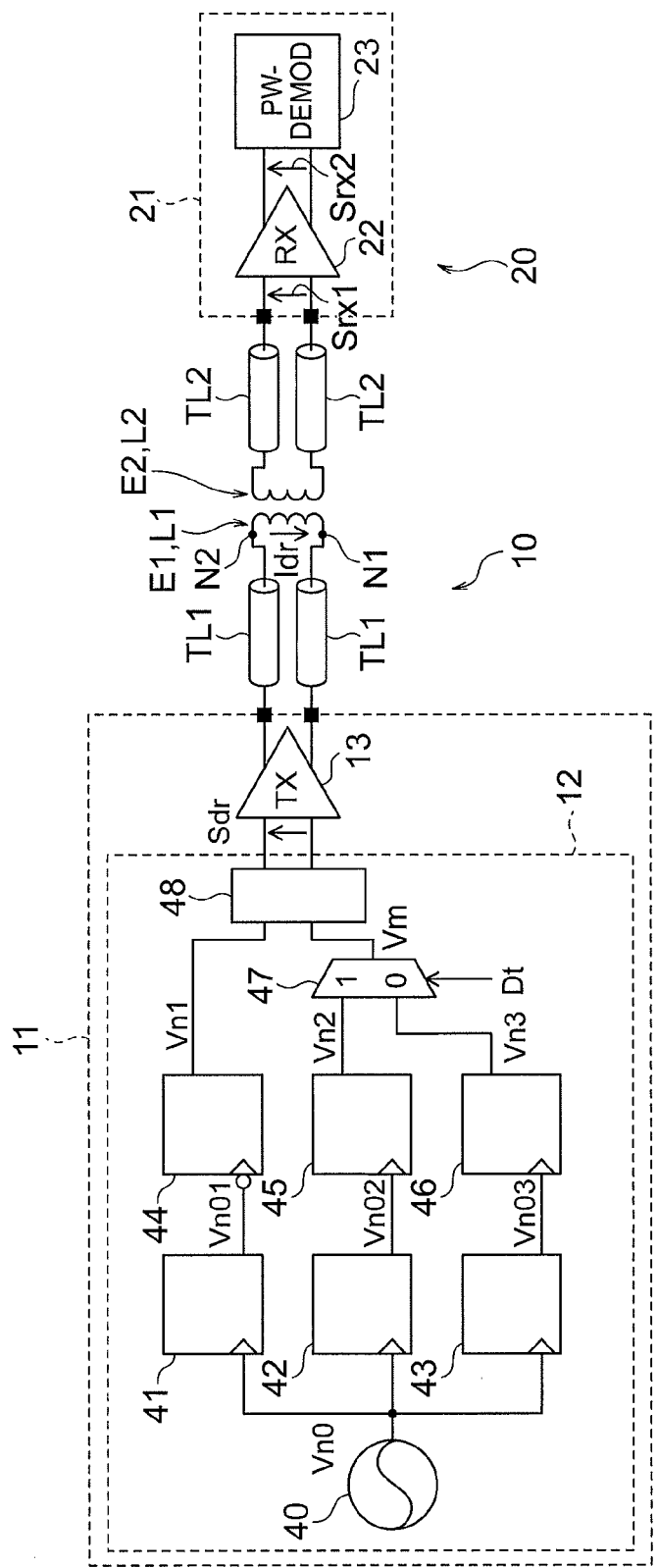
FIG. 6 is a block diagram illustrating a schematic configuration of the communication system of FIG. 1 using a PWM signal.

FIG. 6 is a block diagram illustrating a schematic configuration of the communication system 1 of FIG. 1 using the PWM signal. As illustrated in FIG. 6, the drive signal generation circuit 12 includes a clock signal generator 40, first reference signal generators 41 and 42, a second reference signal generator 43, a first pulse generator 44, a second pulse generator 45, a third pulse generator 46, a multiplexer (selection circuit) 47, and a signal combining circuit 48.

Figure 7:
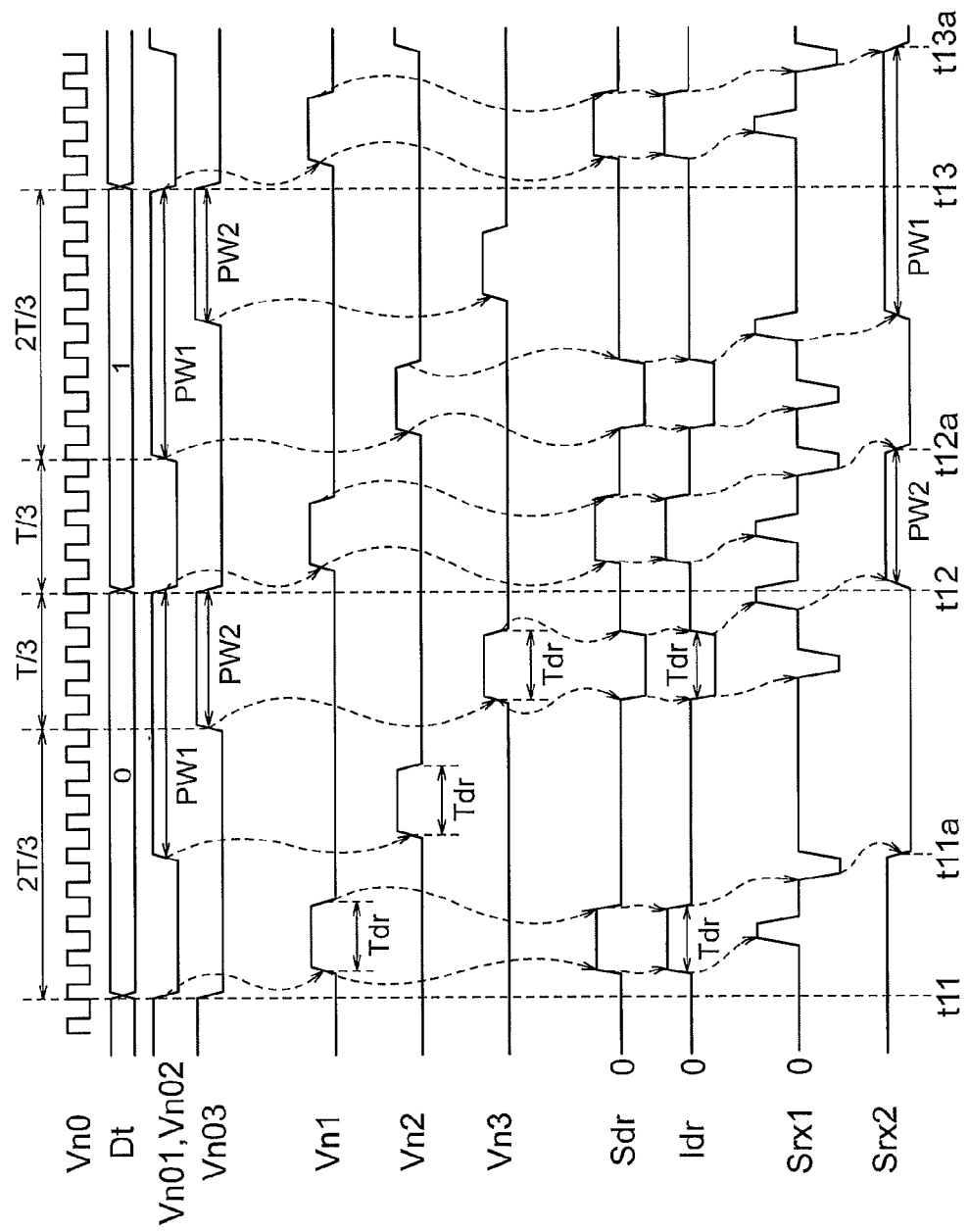
FIG. 7 is a timing chart of the communication system of FIG. 6.

FIG. 7 is a timing chart of the communication system 1 of FIG. 6. As illustrated in FIG. 7, it is assumed that a 1-bit length of transmission data Dt to be submitted is T (seconds).

The clock signal generator 40 generates a clock signal Vn0. As an example, it is assumed that a cycle of the clock signal Vn0 is T/12.

The first reference signal generators 41 and 42 generate, in synchronization with the clock signal Vn0, first reference signals Vn01 and Vn02 corresponding to a first the logic "1" of the transmission data Dt to be transmitted. The first reference signals Vn01 and Vn02 repeatedly include a pulse having a first pulse width PW1 in cycle T. Here, the first pulse width PW1 is 2T/3. In other words, the first reference signals Vn01 and Vn02 are "L" during the period of T/3 from time t11 and then becomes "H" during the period of 2T/3. One of the first reference signal generators 41 and 42 may be provided.

The second reference signal generator 43 generates, in synchronization with the clock signal Vn0, a second reference signal Vn03 corresponding to a second logic "0" of the transmission data Dt. The second reference signal Vn03 repeatedly includes a pulse having a second pulse width PW2 in cycle T. The second pulse width PW2 is narrower than the first pulse width PW1 and is T/3 here. In other words, the second reference signal Vn03 is "L" during the period of 2T/3 from time t11 and then becomes "H" during the period of T/3.

The timing of the falling edge of the first reference signals Vn01 and Vn02 is equal to the timing of the falling edge of the second reference signal Vn03. The timing of the rising edge of the first reference signals Vn01 and Vn02 is different from the timing of the rising edge of the second reference signal Vn03.

The transmission signal Stx, which is not illustrated, is equal to the first reference signals Vn01 and Vn02 when the transmission data Dt is the first logic "1", and equal to the second reference signal Vn03 when the transmission data Dt is the second logic "0". In the example of FIG. 7, the transmission signal Stx is equal to the second reference signal Vn03 from time t11 to t12. The transmission signal Stx is equal to the first reference signals Vn01 and Vn02 from time t12 to t13. Therefore, the transmission signal Stx alternately repeats "L" and "H" in cycle T and becomes the PWM signal in which a period of "H" is different in one cycle T in response to the transmission data Dt. In other words, the transmission signal Stx is modulated so that the period of "H" is different in one cycle T in response to the transmission data Dt.

The first pulse generator 44 generates, in synchronization with the falling edge of the first reference signal Vn01 or the second reference signal Vn03, a first pulse signal Vn1 including a pulse having a pulse width Tdr corresponding to the driving period Tdr. In the illustrated example, the first pulse signal Vn1 is synchronized with the falling edge of the first reference signal Vn01.

The second pulse generator 45 generates, in synchronization with the rising edge of the first reference signal Vn02, a second pulse signal Vn2 including a pulse having the pulse width Tdr corresponding to the driving period Tdr.

The third pulse generator 46 generates, in synchronization with the rising edge of the second reference signal Vn03, a third pulse signal Vn3 including a pulse having the pulse width Tdr corresponding to the driving period Tdr.

The multiplexer 47 selects and outputs, in response to the transmission data Dt, either of the second pulse signal Vn2 or the third pulse signal Vn3. Here, the multiplexer 47 selects the second pulse signal Vn2 when the transmission data Dt is "1" and selects the third pulse signal Vn3 when the transmission data Dt is "0".

The signal combining circuit 48 combines the first pulse signal Vn1 with an output signal Vm of the multiplexer 47 and generates the drive signal Sdr. More specifically, the signal combining circuit 48 generates the drive signal Sdr which becomes the positive voltage in synchronization with the first pulse signal Vn1 and becomes the negative voltage in synchronization with the output signal Vm (the second pulse signal Vn2 or the third pulse signal Vn3) of the multiplexer 47.

Therefore, the drive current Idr flows through the inductor L1 in response to the drive signal Sdr. Similarly to FIG. 2, since the drive current Idr flows during the driving period Tdr, it is possible to reduce the power consumption.

Then, as the first reception signal Srx1, the positive pulse is generated in synchronization with the rising edge of the drive current Idr, and the negative pulse is generated in synchronization with the falling edge of the drive current Idr.

In this manner, it is possible to obtain the second reception signal Srx2 equivalent to the transmission signal Stx. That is, the second reception signal Srx2 from time t11a to t12a is equivalent to the second reference signal Vn03 from time t11 to t12. The second reception signal Srx2 from time t12a to t13a is equivalent to the first reference signals Vn01 and Vn02 from time t12 to t13. As described above, the transmission signal Stx is equal to the second reference signal Vn03 from time t11 to t12, and the transmission signal Stx is equal to the first reference signals Vn01 and Vn02 from time t12 to t13. Therefore, the second reception signal Srx2 is equivalent to the transmission signal Stx.

The demodulator 23 demodulates reception data based on the length of the period of "H" of the second reception signal Srx2. In other words, when the length of the period of "H" after the period of "L" of the second reception signal Srx2 is relatively long (about 2T/3), the demodulator 23 demodulates the logic "1" as the reception data. Alternatively, when the length of the period of "H" after the period of "L" of the second reception signal Srx2 is relatively short (about T/3), the demodulator 23 demodulates the logic "0" as the reception data. Therefore, it is possible to obtain the reception data equal to the transmission data Dt.

As described above, according to the present embodiment, the drive current Idr flows through the transmission inductor L1 in synchronization with the rising edge and the falling edge of the transmission signal Stx during the driving period Tdr. Thus, during the period where the transmission signal Stx does not change after the driving period Tdr has passed, it is possible to prevent the drive current Idr from flowing. Therefore, it is possible to reduce the power consumption of the transmission circuit 11.

Furthermore, after the driving period Tdr, the second and fourth switching elements SW2 and SW4 are made conductive and the first and third switching elements SW1 and SW3 are made non-conductive, and thereby the ground voltage is supplied to both of the ends of the transmission inductor L1. Thus, it is possible to suppress the ringing of the drive current Idr. Therefore, it is possible to suppress the deterioration of the waveform quality of the first reception signal Srx1.

Note that, after the driving period Tdr, the drive signal generation circuit 12 may make the first and third switching elements SW1 and SW3 conductive and the second and fourth switching elements SW2 and SW4 non-conductive, and apply the drive voltage VMID to both of the ends N1 and N2 of the transmission inductor L1 as the applied voltage. In such a manner, it is possible to suppress the ringing of the drive current Idr.

Second Embodiment

In a second embodiment, a configuration of a drive circuit 13 is different that in the first embodiment.

Figure 8:
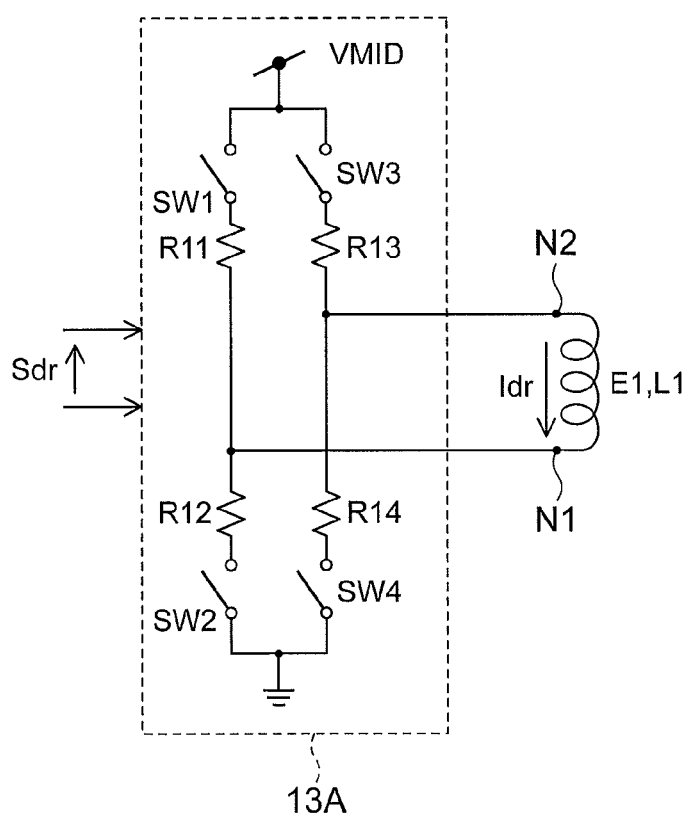
FIG. 8 is a circuit diagram illustrating a configuration of a drive circuit according to a second embodiment.

FIG. 8 is a circuit diagram illustrating a configuration of a drive circuit 13A according to the second embodiment. In FIG. 8, the same reference sign is assigned to a configuration part common to FIG. 2, and different parts will be mainly described below.

The drive circuit 13 A includes, instead of the resistors R1 and R2 of FIG. 2, a resistor (fifth impedance element) R11, a resistor (sixth impedance element) R12, a resistor (seventh impedance element) R13, and a resistor (eighth impedance element) R14.

The resistor R11 is connected between the other end of the first switching element SW1 and one end N1 of the transmission inductor L1. The resistor R12 is connected between the other end of the second switching element SW2 and one end N1 of the transmission inductor L1.

The resistor R13 is connected between the other end of the third switching element SW3 and the other end N2 of the transmission inductor L1. The resistor R14 is connected between the other end of the fourth switching element SW4 and the other end N2 of the transmission inductor L1. The resistors R11 to R14 determine an output impedance of the drive circuit 13A.

In the communication system 1 using the drive circuit 13A, it is possible to obtain the effect similar to the first embodiment.

Third Embodiment

In a third embodiment, the number of the switching elements of the drive circuit 13 is different from that in the first embodiment.

Figure 9:
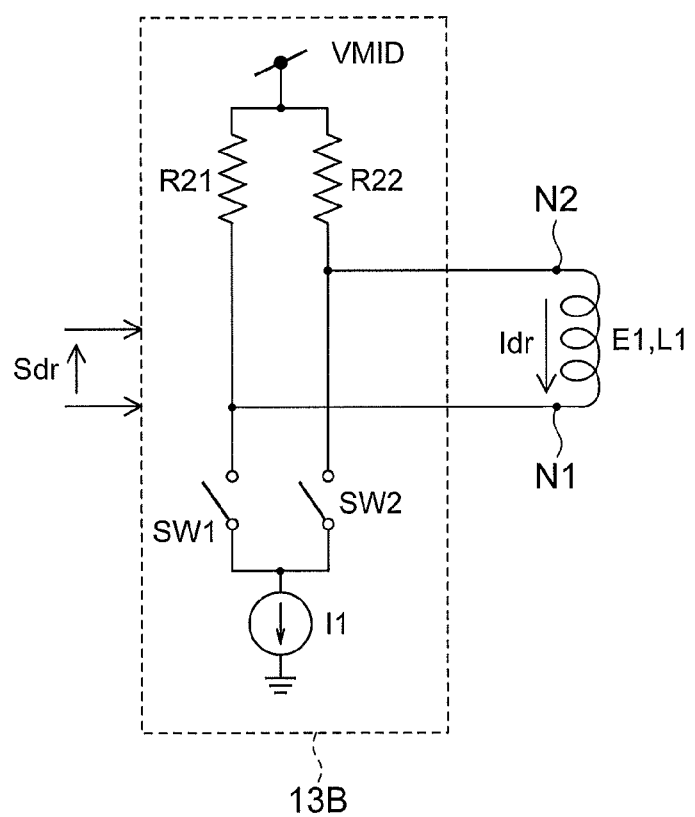
FIG. 9 is a circuit diagram illustrating a configuration of a drive circuit according to a third embodiment.

FIG. 9 is a circuit diagram illustrating a configuration of a drive circuit 13B according to the third embodiment. In FIG. 9, the same reference sign is assigned to a configuration part common to FIG. 1, and different parts will be mainly described below.

The drive circuit 13 B includes a resistor (first impedance element) R21, a resistor (second impedance element) R22, a first switching element SW1, a second switching element SW2, and a constant current source I1.

The resistor R21 includes one end, to which a drive voltage (first voltage) VMID is supplied, and the other end connected to one end N1 of the transmission inductor L1.

The resistor R22 includes one end, to which the drive voltage VMID is supplied, and the other end connected to the other end N2 of the transmission inductor L1.

The first switching element SW1 includes one end connected to the other end of the resistor R21. The second switching element SW2 includes one end connected to the other end of the resistor R22.

The constant current source I1 includes one end connected to the other end of the first switching element SW1 and the other end of the second switching element SW2, and the other end to which a ground voltage (second voltage) is supplied.

In synchronization with a rising edge and a falling edge of a transmission signal Stx, the drive signal generation circuit 12 makes the first switching element SW1 or the second switching element SW2 conductive during a driving period Tdr and causes the drive current Idr to flow. Furthermore, the drive signal generation circuit 12 makes the first and second switching elements SW1 and SW2 non-conductive after the driving period Tdr, and applies the applied voltage to both of the ends N1 and N2 of the transmission inductor L1.

When the first switching element SW1 is made conductive, based on the constant current of the constant current source the positive drive current Idr flows through the resistor R22 and the transmission inductor L1, and the current also flows through the resistor R21. When the second switching element SW2 is made conductive, the negative drive current Idr flows through the resistor R21 and the transmission inductor L1, and the current also flows through the resistor R22.

According to the present embodiment, since the first and second switching elements SW1 and SW2 are made non-conductive after the driving period Tdr, the drive voltage VMID is applied as the applied voltage to the one end N1 of the transmission inductor L1 through the resistor R21, and the drive voltage VMID is applied as the applied voltage to the other end N2 of the transmission inductor L1 through the resistor R22. Therefore, the voltage at both of the ends N1 and N2 of the transmission inductor L1 becomes stable, and it is possible to obtain the effect similar to the first embodiment.

In addition, since the number of the switching elements can be reduced in comparison with the first embodiment, the first and the second switching elements SW1 and SW2 can be easily controlled.

Fourth Embodiment

A fourth embodiment is different from the third embodiment in reversing the relation of the drive voltage VMID and the ground voltage.

Figure 10:
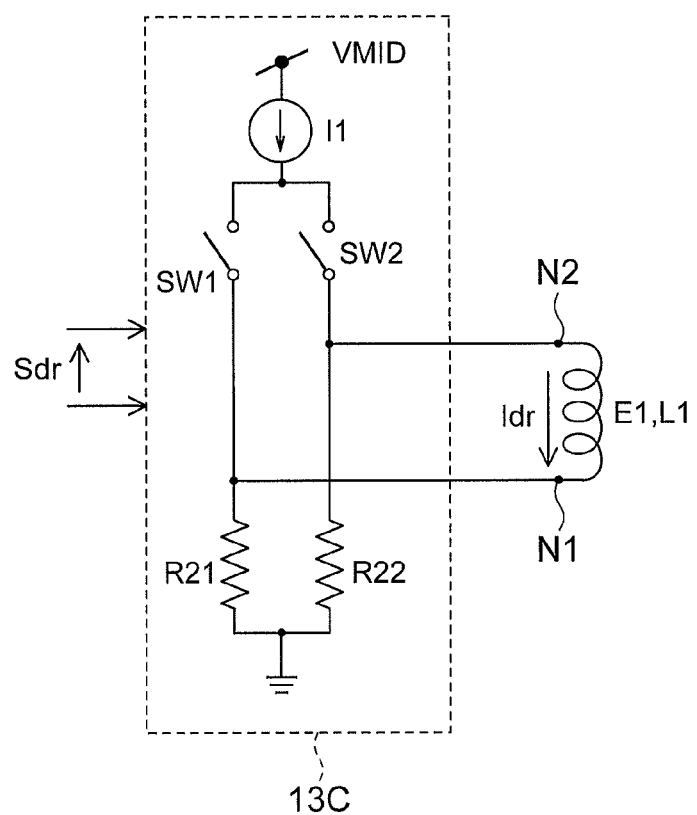
FIG. 10 is a circuit diagram illustrating a configuration of a drive circuit according to a fourth embodiment.

FIG. 10 is a circuit diagram illustrating a configuration of a drive circuit 13C according to the fourth embodiment. In FIG. 10, the same reference sign is assigned to a configuration part common to FIG. 9, and different parts will be mainly described below.

The resistor R21 includes one end, to which a ground voltage (first voltage) is supplied, and the other end connected to one end N1 of the transmission inductor L1.

The resistor R22 includes one end, to which the ground voltage is supplied, and the other end connected to the other end N2 of the transmission inductor L1.

The first switching element SW1 includes one end connected to the other end of the resistor R21. The second switching element SW2 includes one end connected to the other end of the resistor R22.

The constant current source I1 includes one end connected to the other end of the first switching element SW1 and the other end of the second switching element SW2, and the other end to which a drive voltage (second voltage) VMID is supplied.

Similarly to the third embodiment, the drive signal generation circuit 12 makes the first and second switching elements SW1 and SW2 non-conductive after the driving period Tdr. Thus, the ground voltage is applied as the applied voltage to the one end N1 of the transmission inductor L1 through the resistor R21, and the ground voltage is applied as the applied voltage to the other end N2 of the transmission inductor L1 through the resistor R22. Therefore, it is possible to obtain the effect similar to the third embodiment.

Fifth Embodiment

Before the description of a fifth embodiment, a variation of a common mode voltage in the communication system 1 of the first embodiment will be described.

Figure 11:
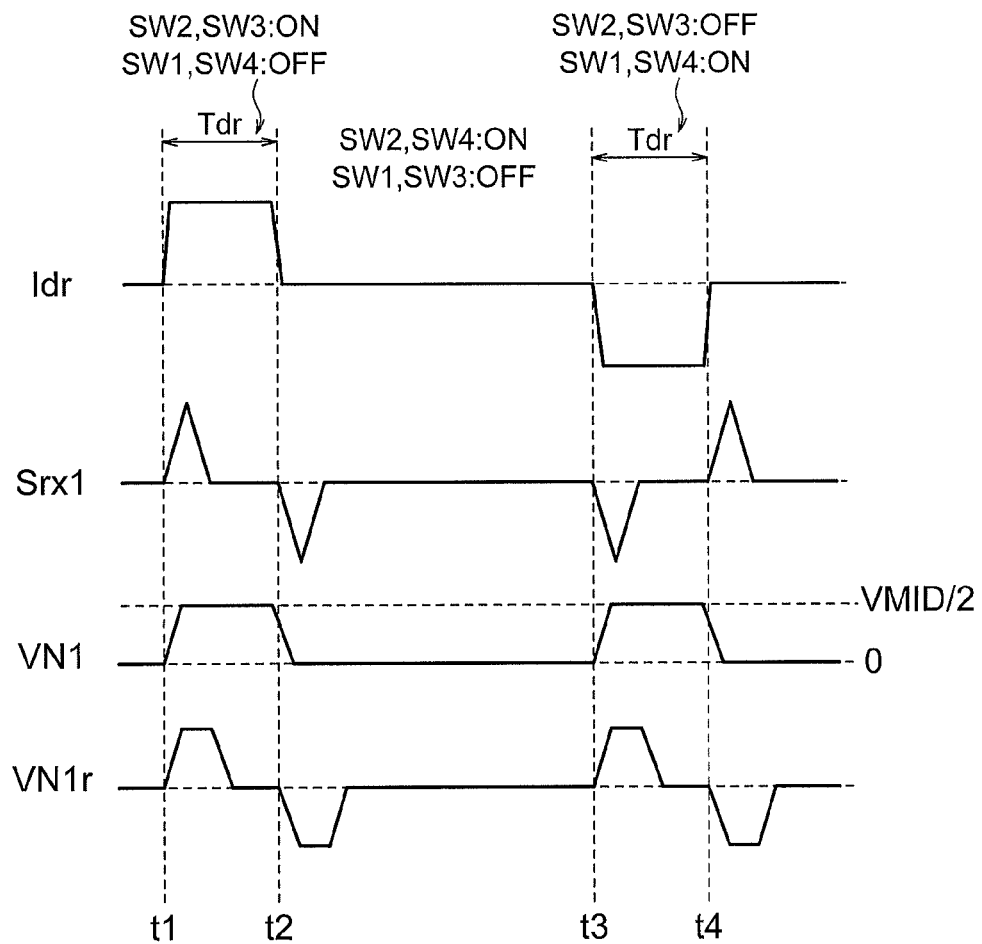
FIG. 11 is a timing chart to describe a variation of a common mode voltage in the communication system of FIG. 1.

FIG. 11 is a timing chart to describe the variation of the common mode voltage in the communication system 1 of FIG. 1. FIG. 11 corresponds to FIG. 3. As illustrated in FIG. 11, until time t1, since the second and fourth switching elements SW2 and SW4 are conductive, a common mode voltage VN1 at the one end N1 of the transmission inductor L1 is 0 V.

Next, at time t1, in order to cause the drive current Idr to flow, the second and third switching elements SW2 and SW3 become conductive, and the common mode voltage VN1 at the one end N1 of the transmission inductor L1 increases to substantially half of the drive voltage VMID (VMID/2).

Here, when capacitive coupling due to the parasitic capacitance Cp1 occurs between the one end N1 of the transmission inductor L1 and one end N1r of the reception inductor L2, the increase of the common mode voltage VN1 causes a pulse-like variation in a common mode voltage VN1r at the one end N1r of the reception inductor L2.

Similarly, at times t2, t3, and t4, the pulse-like variation is caused in the common mode voltage VN1r.

Similarly, a parasitic capacitance Cp2 between the other end N2 of the transmission inductor L1 and the other end N2r of the reception inductor L2 causes variation of a common mode voltage VN2r at the other end N2r of the reception inductor L2 (not illustrated).

The first reception signal Srx1 is the difference between the common mode voltage VN1r and the common mode voltage VN2r, and varies similarly to FIG. 3. Therefore, when the reception circuit 21 which is hardly affected by the variation of the common mode voltages VN1r and VN2r is used, the communication system operates without problems as described in the first embodiment. However, when the common mode rejection ratio of the reception circuit 21 is relatively low or the like, the reception sensitivity is deteriorated due to the variation of the common mode voltages VN1r and VN2r.

The deterioration similarly occurs in the second to fourth embodiments.

Therefore, in the fifth embodiment, the first to fourth switching elements SW1 to SW4 are made conductive after the driving period Tdr.

Figure 12:
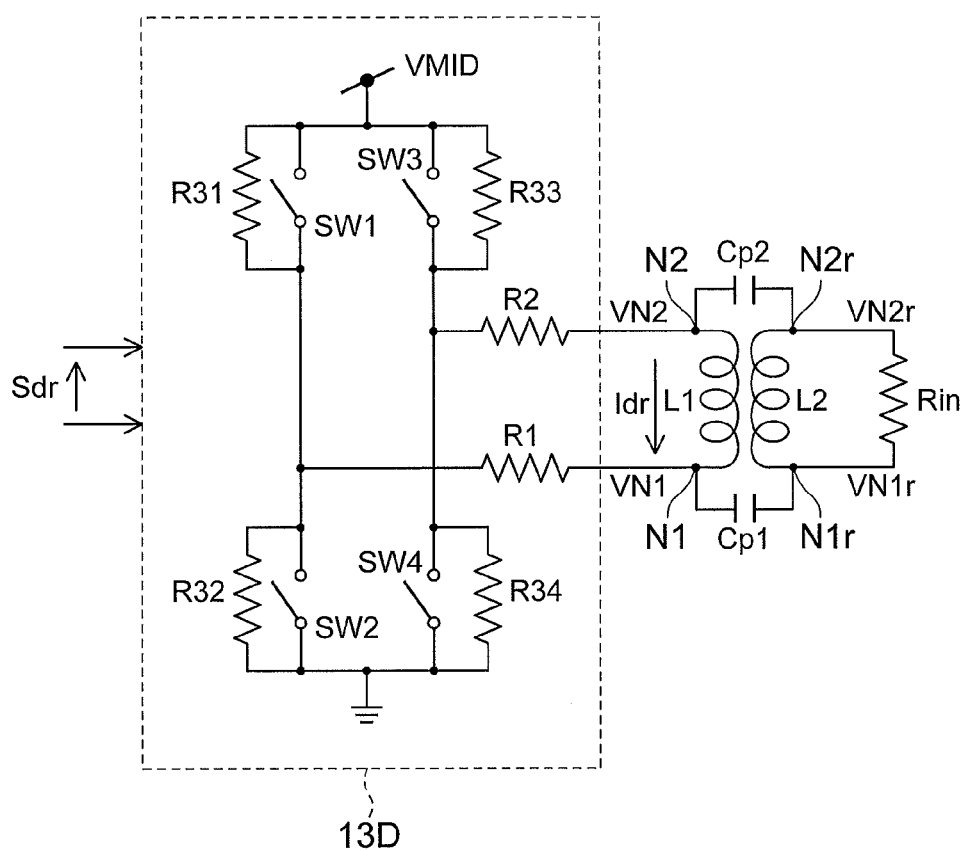
FIG. 12 is a circuit diagram illustrating a configuration of a drive circuit according to a fifth embodiment.

FIG. 12 is a circuit diagram illustrating a configuration of a drive circuit 13D according to the fifth embodiment. In FIG. 12, the same reference sign is assigned to a configuration part common to FIG. 2, and different parts will be mainly described below.

The drive circuit 13D includes, in addition to the configuration of FIG. 2, a resistor (first impedance element) R31, a resistor (second impedance element) R32, a resistor (third impedance element) R33, and a resistor (fourth impedance element) R34. The resistor values of the resistors R31 to R34 are substantially equal.

The resistor R31 is connected between one end and the other end of the first switching element SW1. The resistor R32 is connected between one end and the other end of the second switching element SW2. The resistor R33 is connected between one end and the other end of the third switching element SW3. The resistor R34 is connected between one end and the other end of the fourth switching element SW4.

Similarly to the first embodiment, the drive signal generation circuit 12 makes the first and fourth switching elements SW1 and SW4, or the second and third switching elements SW2 and SW3 conductive during the driving period Tdr, and causes the drive current Idr to flow. Furthermore, the drive signal generation circuit 12 makes the first to fourth switching elements SW1 to SW4 conductive after the driving period Tdr, and applies the applied voltage to both of the ends N1 and N2 of the transmission inductor L1. The applied voltage is substantially half of the drive voltage VMID (VMID/2). Then, the drive signal generation circuit 12 makes the first to fourth switching elements SW1 to SW4 non-conductive, and applies the voltage between the drive voltage VMID and the ground voltage to both of the ends N1 and N2 of the transmission inductor L1. The voltage between the drive voltage VMID and the ground voltage is substantially half of the drive voltage VMID (VMID/2).

Note that, in FIG. 12, an input impedance of the reception circuit 21 is equivalently represented by the resistor Rin.

Figure 13:
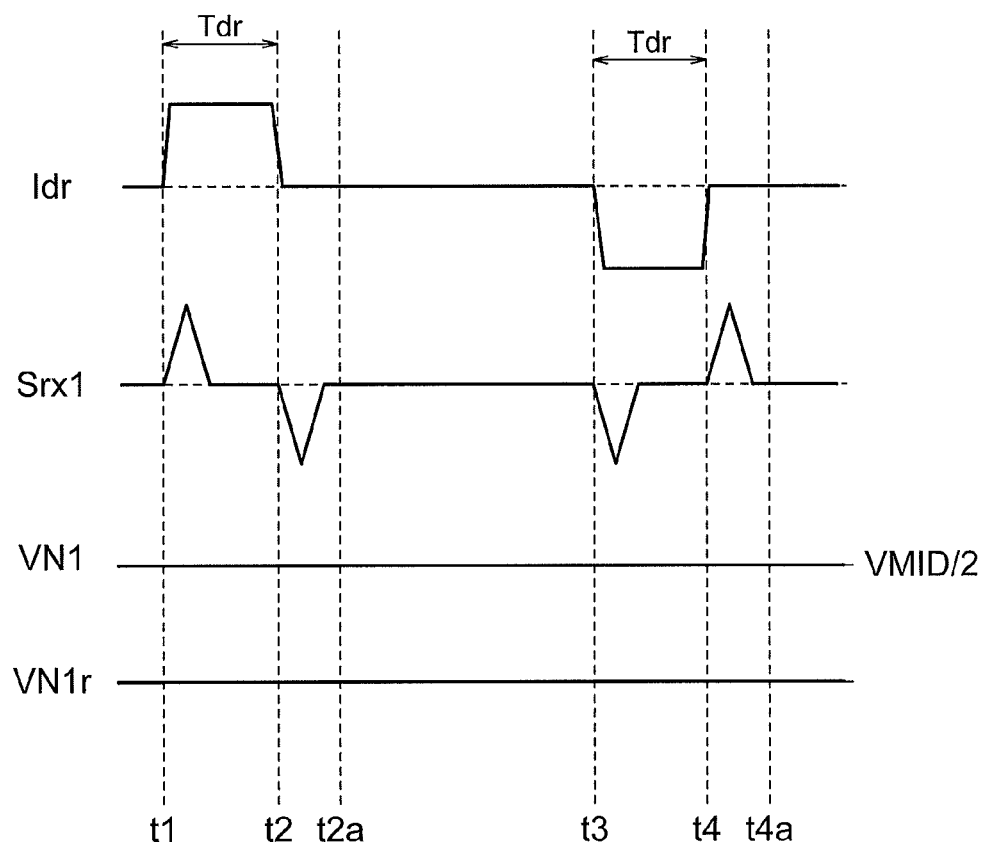
FIG. 13 is a timing chart of a communication system according to the fifth embodiment.

FIG. 13 is a timing chart of the communication system 1 according to the fifth embodiment. After time t2 illustrated in FIG. 13, that is, after the driving period Tdr, the first to fourth switching elements SW1 to SW4 are made conductive, and thereby the common mode voltage VN1 maintains substantially half of the drive voltage VMID (VMID/2).

This also applies to the common mode voltage VN2, which is not illustrated. Thus, the drive current Idr becomes 0 A, and it is possible to suppress the ringing of the drive current Idr.

Next, at time t2a, the first to fourth switching elements SW1 to SW4 are made non-conductive, and the common mode voltage VN1 is determined by the resistors R31 and R32 and maintains substantially half of the drive voltage VMID (VMID/2). This also applies to the common mode voltage VN2, which is not illustrated.

Each resistor value of the resistors R31 to R34 is higher than each impedance of the first to fourth switching element SW1 to SW4 when conductive. Therefore, it is possible to reduce the power consumption. In terms of reducing the power consumption, the period where the first to fourth switching elements SW1 to SW4 are made conductive (from time t2 to t2a) is preferably shorter than the period where the first to fourth switching elements SW1 to SW4 are made non-conductive (from time t2a to t3).

Furthermore, the operations after time t3 are similar to the above, the first to fourth switching elements SW1 to SW4 are made conductive at time t4, and the first to fourth switching elements SW1 to SW4 are made non-conductive at time t4a.

According to the present embodiment, after the driving period Tdr, the first to fourth switching elements SW1 to SW4 are made conductive, and then the first to fourth switching elements SW1 to SW4 are made non-conductive. Thus, after the driving period Tdr, the common mode voltages VN1r and VN2r at both of the ends N1 and N2 of the transmission inductor L1 maintain substantially half of the drive voltage VMID (VMID/2). In other words, during the driving period Tdr and thereafter, it is possible to prevent the common mode voltages VN1 and VN2 from changing.

Therefore, when the common mode rejection ratio of the reception circuit 21 is low or the like, it is possible to suppress the deterioration of the reception sensitivity. Furthermore, it is possible to obtain the effect of the first embodiment.

Sixth Embodiment

In a sixth embodiment, the second embodiment and the fifth embodiment are combined.

Figure 14:
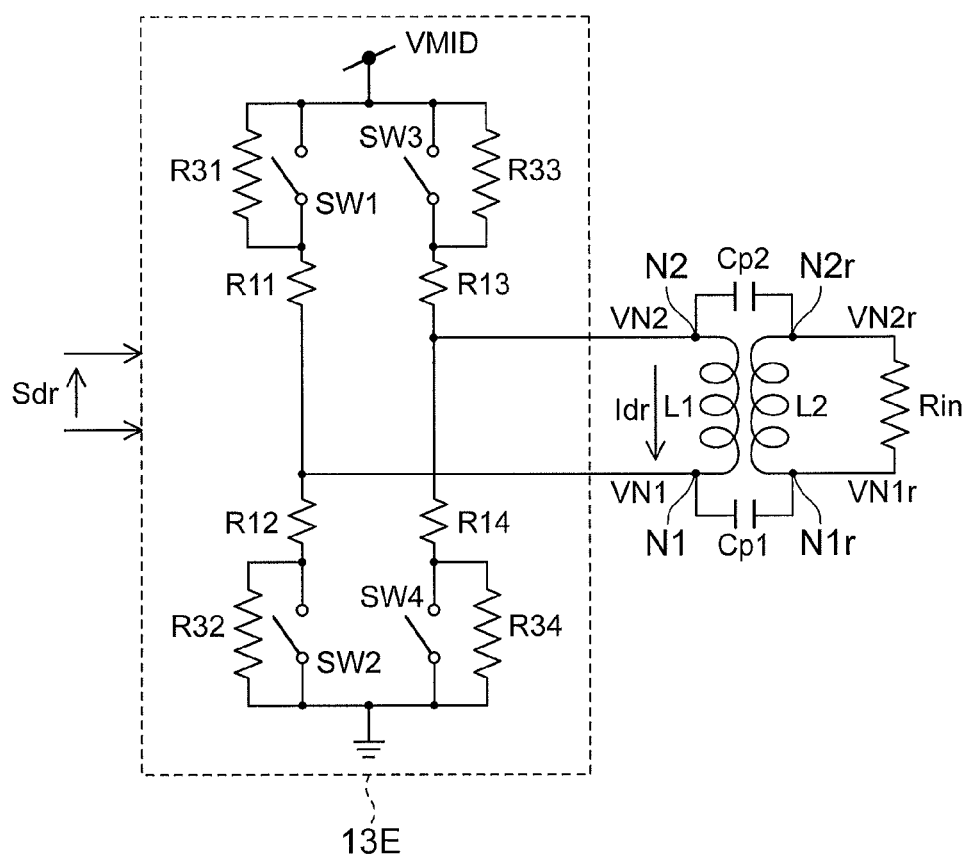
FIG. 14 is a circuit diagram illustrating a configuration of a drive circuit according to a sixth embodiment.

FIG. 14 is a circuit diagram illustrating a configuration of a drive circuit 13E according to the sixth embodiment. In FIG. 14, the same reference sign is assigned to a configuration part common to FIG. 12, and different parts will be mainly described below.

The drive circuit 13E includes, instead of the resistors R1 and R2 of FIG. 12, resistors R11 to R14.

The resistor R11 is connected between the other end of the first switching element SW1 and one end N1 of the transmission inductor L1. The resistor R12 is connected between the other end of the second switching element SW2 and one end N1 of the transmission inductor L1.

The resistor R13 is connected between the other end of the third switching element SW3 and the other end N2 of the transmission inductor L1. The resistor R14 is connected between the other end of the fourth switching element SW4 and the other end N2 of the transmission inductor L1.

In the present embodiment, it is possible to obtain the effect similar to the fifth embodiment. Furthermore, with the resistors R11 to R14, the power consumption during the period where the first to fourth switching elements SW1 to SW4 are conductive can be reduced in comparison with the fifth embodiment.

Seventh Embodiment

In a seventh embodiment, the configuration of the drive circuit 13D of the fifth embodiment is simplified.

Figure 15A:
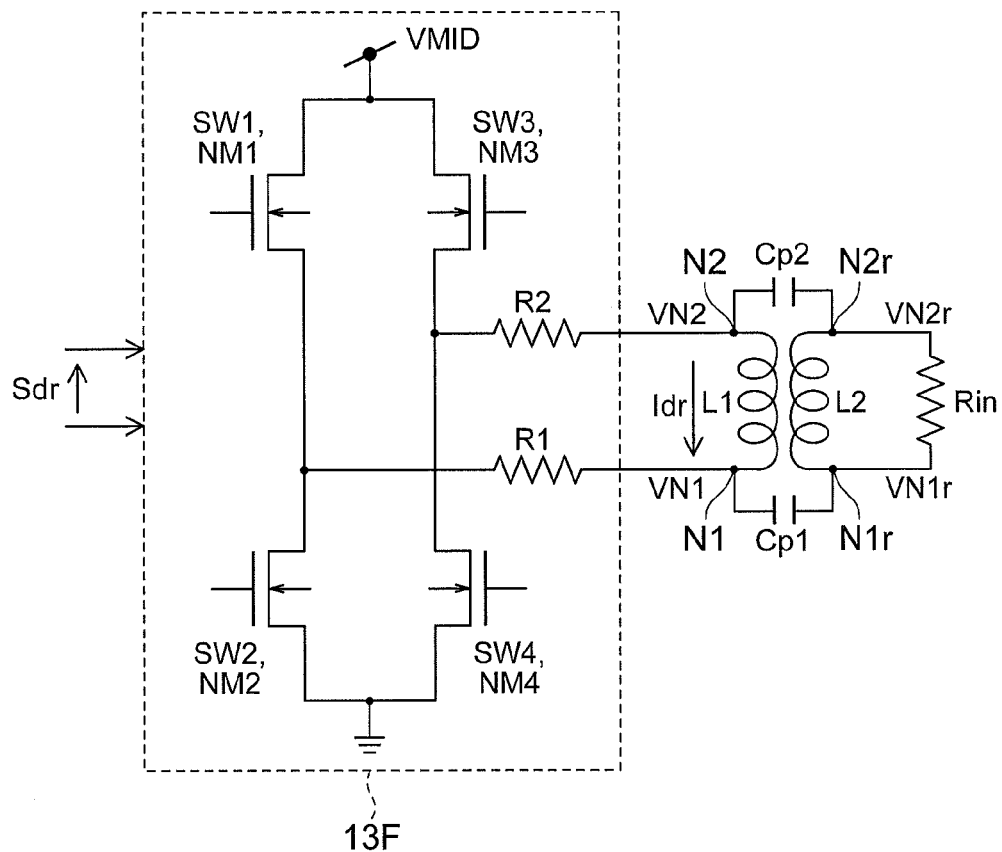
FIG. 15A is a circuit diagram illustrating a configuration of a drive circuit according to the seventh embodiment.

FIG. 15A is a circuit diagram illustrating a configuration of a drive circuit 13F according to the seventh embodiment. In FIG. 15A, the same reference sign is assigned to a configuration part common to FIG. 12, and different parts will be mainly described below.

In the drive circuit 13F, the first to fourth switching element SW1 to SW4 are NMOS transistors NM1 to NM4 respectively. The resistors R31 to R34 of the fifth embodiment are not provided.

The drive signal generation circuit 12 decreases each impedance in current paths of the first and fourth switching elements SW1 and SW4, or the second and third switching elements SW2 and SW3 during the driving period Tdr, and causes the drive current Idr to flow. Each impedance of the first and fourth switching element SW1 and SW4, or the second and third switching elements SW2 and SW3 at this time is equal to each impedance when the first to fourth switching elements SW1 to SW4 of the fifth embodiment are conductive.

The drive signal generation circuit 12 decreases each impedance in the current paths of the first to fourth switching elements SW1 to SW4 after the driving period Tdr, and applies the applied voltage to both of the ends N1 and N2 of the transmission inductor L1. Each impedance of the first to fourth switching elements SW1 to SW4 at this time is equal to the above described impedance during the driving period Tdr. The applied voltage is substantially half of the drive voltage VMID (VMID/2).

Then, the drive signal generation circuit 12 increases each impedance in the current paths of the first to fourth switching elements SW1 to SW4, and applies the voltage between the drive voltage VMID and the ground voltage to both of the ends N1 and N2 of the transmission inductor L1. Each impedance of the first to fourth switching elements SW1 to SW4 at this time is equal to each resistor value of the resistors R31 to R34 of the fifth embodiment. The voltage between the drive voltage VMID and the ground voltage is substantially half of the drive voltage VMID (VMID/2).

As described above, it is possible to obtain the effect of the fifth embodiment. Furthermore, according to the present embodiment, since the resistors R31 to R34 are not provided, the number of components is fewer than that of the fifth embodiment and the design is easy.

Figure 15B:
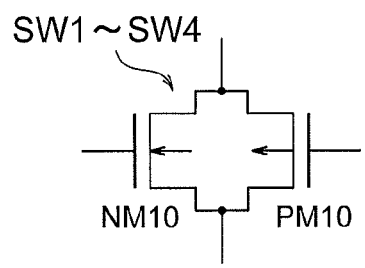
FIG. 15B is a circuit diagram illustrating another example of a first to fourth switching elements of FIG. 15A.

Note that, the first to fourth switching elements SW1 to SW4 may be other transistors, such as, PMOS transistors or bipolar transistors, and may be switching elements in which a PMOS transistor PM10 and an NMOS transistor NM10 are connected in parallel as illustrated in FIG. 15B.

Eighth Embodiment

In an eighth embodiment, the second embodiment and the seventh embodiment are combined.

Figure 16:
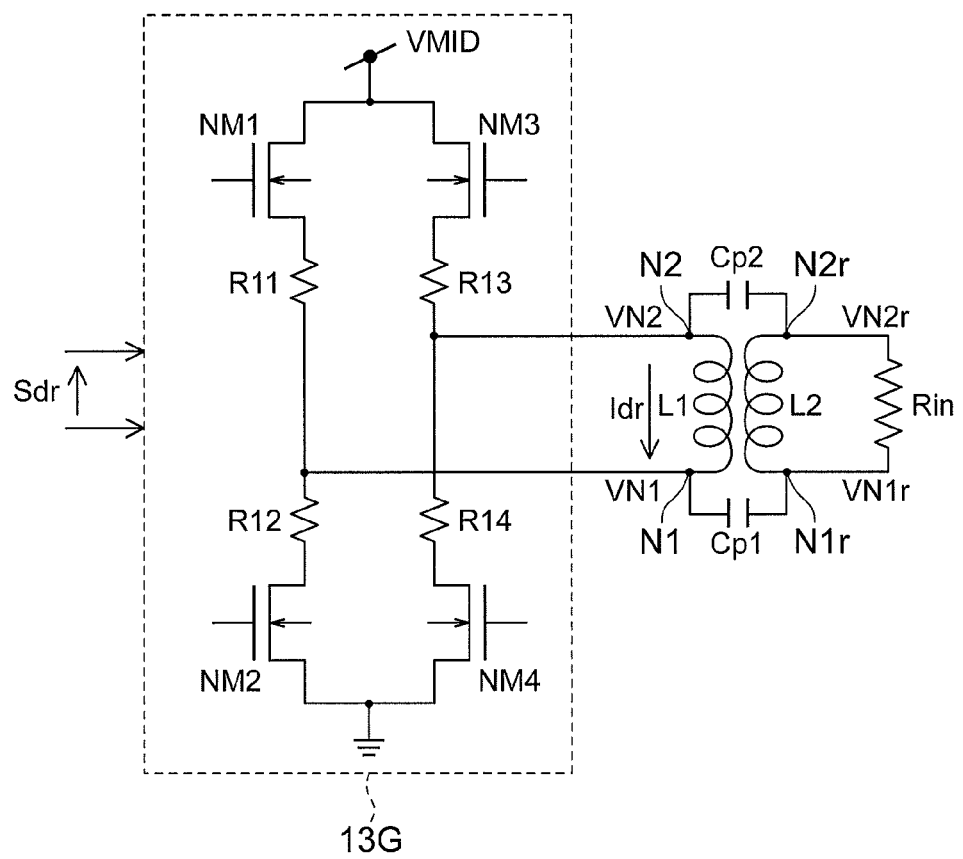
FIG. 16 is a circuit diagram illustrating a configuration of a drive circuit according to an eighth embodiment.

FIG. 16 is a circuit diagram illustrating a configuration of a drive circuit 13G according to the eighth embodiment. In FIG. 16, the same reference sign is assigned to a configuration part common to FIG. 15A, and different parts will be mainly described below.

The drive circuit 13G includes, instead of the resistors R1 and R2 of FIG. 15A, resistors R11 to R14.

The resistor R11 is connected between the other end of the first switching element SW1 and one end N1 of the transmission inductor L1. The resistor R12 is connected between the other end of the second switching element SW2 and one end N1 of the transmission inductor L1.

The resistor R13 is connected between the other end of the third switching element SW3 and the other end N2 of the transmission inductor L1. The resistor R14 is connected between the other end of the fourth switching element SW4 and the other end N2 of the transmission inductor L1.

In the present embodiment, it is possible to obtain the effect similar to the seventh embodiment. Furthermore, the power consumption during the period where the first to fourth switching elements SW1 to SW4 are conductive can be reduced in comparison with the seventh embodiment.

Ninth Embodiment

A ninth embodiment is different from the first embodiment in using capacitive coupling as the AC coupling.

Figure 17:
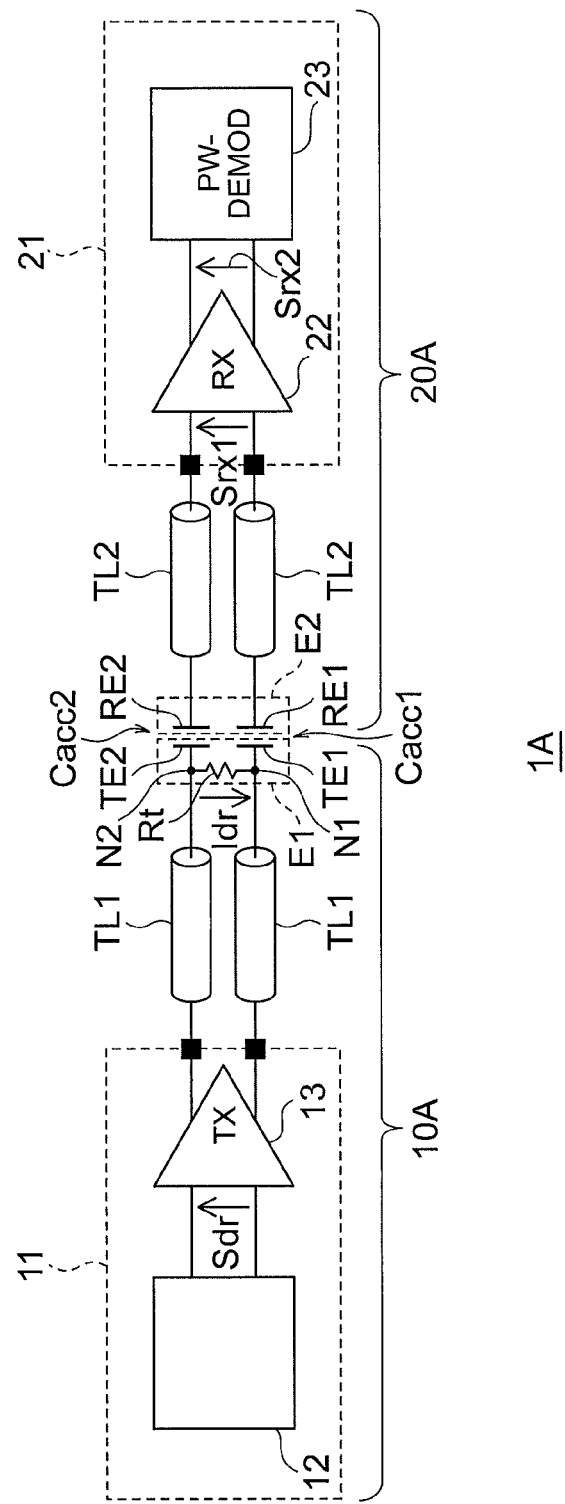
FIG. 17 is a block diagram illustrating a schematic configuration of a communication system according to a ninth embodiment.

FIG. 17 is a block diagram illustrating a schematic configuration of a communication system 1A according to the ninth embodiment. In FIG. 17, the same reference sign is assigned to a configuration part common to FIG. 1, and different parts will be mainly described below.

A transmitting AC coupling element E1 includes a first transmitting electrode TE1, a second transmitting electrode TE2, and a termination resistor Rt connected between the first transmitting electrode TE1 and the second transmitting electrode TE2. The first transmitting electrode TE1 is connected to one end N1 of the transmitting AC coupling element E1. The second transmitting electrode TE2 is connected to the other end N2 of the transmitting AC coupling element E1. The first transmitting electrode TE1 and the second transmitting electrode TE2 are, for example, thin-filmy metallic patterns having an arbitrary shape, such as a circle, an oval, or a rectangle in plan view, and provided on a printed wiring board of a transmitter 10A.

One first transmission line TL1 connects a transmission circuit 11 to the first transmitting electrode TE1. The other first transmission line TL1 connects the transmission circuit 11 and the second transmitting electrode TE2.

With the termination resistor Rt, it is possible to suppress signal reflection from a receiver 20A to the transmitter 10A.

Similarly to the first embodiment, a drive circuit 13 causes, in response to a drive signal Sdr, a drive current Idr to flow through the transmitting AC coupling element E1 in synchronization with a rising edge and a falling edge of a transmission signal Stx during a driving period Tdr. The drive current Idr flows through the termination resistor Rt. The receiving AC coupling element E2 includes a first receiving electrode RE1 and a second receiving electrode RE2. The first receiving electrode RE1 and the second receiving electrode RE2 are, for example, thin-filmy metallic patterns having an arbitrary shape, such as a circle, an oval, or a rectangle in plan view, and provided on a printed wiring board of the receiver 20A.

One second transmission line TL2 connects the first receiving electrode RE1 to the reception circuit 21. The other second transmission line TL2 connects the second receiving electrode RE2 and the reception circuit 21.

The transmitter 10A and the receiver 20A are adjacently arranged so that the first transmitting electrode TE1 is adjacent to the first receiving electrode RE1 and the second transmitting electrode TE2 is adjacent to the second receiving electrode RE2 when the communication is performed. The distances between the first transmitting electrode TE1 and the first receiving electrode RE1 and between the second transmitting electrode TE2 and the second receiving electrode RE2 are, for example, several mm. With this arrangement, the first transmitting electrode TE1 is capacitively coupled (AC coupled) to the first receiving electrode RE1, and the second transmitting electrode TE2 is capacitively coupled to the second receiving electrode RE2. A coupling capacitance Cacc1 between the first transmitting electrode TE1 and the first receiving electrode RE1, and a coupling capacitance Cacc2 between the second transmitting electrode TE2 and the second receiving electrode RE2 are, for example, several hundreds fF to several pF. Thus, the signal is transmitted from the first transmitting electrode TE1 and the second transmitting electrode TE2 to the first receiving electrode RE1 and the second receiving electrode RE2 through the coupling capacitances Cacc1 and Cacc2.

In this communication system 1A, it is possible to perform the communication similarly to the first embodiment.

In the present embodiment, since the ground voltage is supplied to both ends N1 and N2 of the transmitting AC coupling element E1 after the driving period Tdr, it is possible to obtain the effect similar to the first embodiment.

Note that, instead of the drive circuit 13 of the first embodiment, the drive circuits 13A to 13G of the second to eighth embodiments may be used.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A transmission circuit configured to transmit a transmitting signal to a reception circuit through a transmitting AC coupling element, the reception circuit receiving a reception signal through a receiving AC coupling element, the transmitting AC coupling element being AC coupled to the receiving AC coupling element, the transmission circuit comprising:
a drive signal generation circuit configured to generate a drive signal in synchronization with a transmission signal to be transmitted; and
a drive circuit configured to cause, in response to the drive signal, a drive current to flow between both ends of the transmitting AC coupling element in synchronization with a rising edge and a falling edge of the transmission signal during a driving period set in advance, and apply an applied voltage to both of the ends of the transmitting AC coupling element after the driving period, wherein
the drive circuit comprises:
a first switching element comprising one end to which a first voltage is supplied and an other end connected to one end of the transmitting AC coupling element;
a second switching element comprising one end to which a second voltage is supplied and an other end connected to the one end of the transmitting AC coupling element;

a third switching element comprising one end to which the first voltage is supplied and an other end connected to an other end of the transmitting AC coupling element;

a fourth switching element comprising one end to which the second voltage is supplied and an other end connected to the other end of the transmitting AC coupling element;

a first impedance element connected between the one end and the other end of the first switching element;

a second impedance element connected between the one end and the other end of the second switching element;

a third impedance element connected between the one end and the other end of the third switching element; and a fourth impedance element connected between the one end and the other end of the fourth switching element, the drive signal generation circuit makes the first and fourth switching elements or the second and third switching elements conductive during the driving period and causes the drive current to flow, and the drive signal generation circuit makes, after the driving period, the first to fourth switching elements conductive and applies the applied voltage to both of the ends of the transmitting AC coupling element, and then makes the first to fourth switching elements non-conductive and applies a voltage between the first voltage and the second voltage, to both of the ends of the transmitting AC coupling element.

2. The transmission circuit according to claim 1, wherein impedances of the first to fourth impedance elements are equal.

3. The transmission circuit according to claim 1, wherein each impedance of the first to fourth impedance elements is higher than each impedance of the first to fourth switching elements when conductive.

4. The transmission circuit according to claim 1, wherein the drive signal generation circuit makes the first to fourth switching elements conductive during a period shorter than a period where the first to fourth switching elements are made non-conductive.

5. The transmission circuit according to claim 1, wherein the drive circuit comprises:

a fifth impedance element connected between the one end of the transmitting AC coupling element, and a connection node of the other end of the first switching element and the other end of the second switching element; and a sixth impedance element connected between the other end of the transmitting AC coupling element, and a connection node of the other end of the third switching element and the other end of the fourth switching element.

6. The transmission circuit according to claim 1, wherein the drive circuit comprises:

a fifth impedance element connected between the other end of the first switching element and the one end of the transmitting AC coupling element;

a sixth impedance element connected between the other end of the second switching element and the one end of the transmitting AC coupling element;

a seventh impedance element connected between the other end of the third switching element and the other end of the transmitting AC coupling element; and an eighth impedance element connected between the other end of the fourth switching element and the other end of the transmitting AC coupling element.

7. A transmission circuit configured to transmit a transmitting signal to a reception circuit through a transmitting AC coupling element, the reception circuit receiving a reception signal through a receiving AC coupling element, the transmitting AC coupling element being AC coupled to the receiving AC coupling element, the transmission circuit comprising:

a drive signal generation circuit configured to generate a drive signal in synchronization with a transmission signal to be transmitted; and a drive circuit configured to cause, in response to the drive signal, a drive current to flow between both ends of the transmitting AC coupling element in synchronization with a rising edge and a falling edge of the transmission signal during a driving period set in advance, and apply an applied voltage to both of the ends of the transmitting AC coupling element after the driving period, wherein the drive circuit comprises:

a first switching element comprising one end to which a first voltage is supplied and an other end connected to one end of the transmitting AC coupling element;

a second switching element comprising one end to which a second voltage is supplied and an other end connected to the one end of the transmitting AC coupling element;

a third switching element comprising one end to which the first voltage is supplied and an other end connected to an other end of the transmitting AC coupling element; and a fourth switching element comprising one end to which the second voltage is supplied and an other end connected to the other end of the transmitting AC coupling element, the first to fourth switching elements are transistors, the drive signal generation circuit decreases each impedance of the first and fourth switching elements or the second and third switching elements during the driving period and causes the drive current to flow, and the drive signal generation circuit decreases, after the driving period, each impedance of the first to fourth switching elements and applies the applied voltage to both of the ends of the transmitting AC coupling element, the applied voltage being a voltage between the first voltage and the second voltage, and then increases each impedance of the first to fourth switching elements and applies another voltage between the first voltage and the second voltage, to both of the ends of the transmitting AC coupling element.

8. The transmission circuit according to claim 7, wherein the drive circuit comprises:

a fifth impedance element connected between the one end of the transmitting AC coupling element, and a connection node of the other end of the first switching element and the other end of the second switching element; and a sixth impedance element connected between the other end of the transmitting AC coupling element, and a connection node of the other end of the third switching element and the other end of the fourth switching element.

9. The transmission circuit according to claim 7, wherein the drive circuit comprises:

a fifth impedance element connected between the other end of the first switching element and the one end of the transmitting AC coupling element;

a sixth impedance element connected between the other end of the second switching element and the one end of the transmitting AC coupling element;

a seventh impedance element connected between the other end of the third switching element and the other end of the transmitting AC coupling element; and
an eighth impedance element connected between the other end of the fourth switching element and the other end of the transmitting AC coupling element.

10. A communication system comprising:
a transmitting AC coupling element;
a transmission circuit configured to transmit a transmitting signal through the transmitting AC coupling element;
a receiving AC coupling element to be AC coupled to the transmitting AC coupling element; and
a reception circuit configured to receive a reception signal through the receiving AC coupling element, wherein
the transmission circuit comprises:
a drive signal generation circuit configured to generate a drive signal in synchronization with a transmission signal to be transmitted; and
a drive circuit configured to cause, in response to the drive signal, a drive current to flow between both ends of the transmitting AC coupling element in synchronization with a rising edge and a falling edge of the transmission signal during a driving period set in advance, and supplies, after the driving period, an applied voltage to both of the ends of the transmitting AC coupling element,
the reception circuit comprises a hysteresis circuit having hysteresis characteristics and configured to output a second reception signal in response to a first reception signal received by the receiving AC coupling element, and
a logic of the second reception signal during standby is different from a logic of an initial value of the transmission signal, wherein
the drive circuit comprises:
a first switching element comprising one end to which a first voltage is supplied and an other end connected to one end of the transmitting AC coupling element;
a second switching element comprising one end to which a second voltage is supplied and an other end connected to the one end of the transmitting AC coupling element;
a third switching element comprising one end to which the first voltage is supplied and an other end connected to an other end of the transmitting AC coupling element;
a fourth switching element comprising one end to which the second voltage is supplied and an other end connected to the other end of the transmitting AC coupling element;
a first impedance element connected between the one end and the other end of the first switching element;
a second impedance element connected between the one end and the other end of the second switching element;
a third impedance element connected between the one end and the other end of the third switching element; and
a fourth impedance element connected between the one end and the other end of the fourth switching element,
the drive signal generation circuit makes the first and fourth switching elements or the second and third switching elements conductive during the driving period and causes the drive current to flow, and
the drive signal generation circuit makes, after the driving period, the first to fourth switching elements conductive and applies the applied voltage to both of the ends of the transmitting AC coupling element, and then makes the first to fourth switching elements non-conductive and applies a voltage between the first voltage and the second voltage, to both of the ends of the transmitting AC coupling element.

11. The communication system according to claim 10, wherein
the receiving AC coupling element is a reception inductor, and
the transmitting AC coupling element is a transmission inductor to be inductively coupled to the reception inductor.

12. The communication system according to claim 10, wherein
the receiving AC coupling element comprises:
a first receiving electrode; and
a second receiving electrode, and
the transmitting AC coupling element comprises:
a first transmitting electrode connected to the one end of the transmitting AC coupling element and to be capacitively coupled to the first receiving electrode;
a second transmitting electrode connected to the other end of the transmitting AC coupling element and to be capacitively coupled to the second receiving electrode; and
a termination resistor connected between the first transmitting electrode and the second transmitting electrode, and
the drive current flows through the termination resistor.

13. The communication system according to claim 10, wherein impedances of the first to fourth impedance elements are equal.

14. The communication system according to claim 10, wherein
the drive circuit comprises:
a fifth impedance element connected between the one end of the transmitting AC coupling element, and a connection node of the other end of the first switching element and the other end of the second switching element; and
a sixth impedance element connected between the other end of the transmitting AC coupling element, and a connection node of the other end of the third switching element and the other end of the fourth switching element.

15. The communication system according to claim 10, wherein
the drive circuit comprises:
a fifth impedance element connected between the other end of the first switching element and the one end of the transmitting AC coupling element;
a sixth impedance element connected between the other end of the second switching element and the one end of the transmitting AC coupling element;
a seventh impedance element connected between the other end of the third switching element and the other end of the transmitting AC coupling element; and
an eighth impedance element connected between the other end of the fourth switching element and the other end of the transmitting AC coupling element.

16. A communication system comprising:
a transmitting AC coupling element;
a transmission circuit configured to transmit a transmitting signal through the transmitting AC coupling element;
a receiving AC coupling element to be AC coupled to the transmitting AC coupling element; and a reception circuit configured to receive a reception signal through the receiving AC coupling element, wherein the transmission circuit comprises:
a drive signal generation circuit configured to generate a drive signal in synchronization with a transmission signal to be transmitted; and
a drive circuit configured to cause, in response to the drive signal, a drive current to flow between both ends of the transmitting AC coupling element in synchronization with a rising edge and a falling edge of the transmission signal during a driving period set in advance, and supplies, after the driving period, an applied voltage to both of the ends of the transmitting AC coupling element,
the reception circuit comprises a hysteresis circuit having hysteresis characteristics and configured to output a second reception signal in response to a first reception signal received by the receiving AC coupling element, and
a logic of the second reception signal during standby is different from a logic of an initial value of the transmission signal, wherein the drive circuit comprises:
a first switching element comprising one end to which a first voltage is supplied and an other end connected to one end of the transmitting AC coupling element;
a second switching element comprising one end to which a second voltage is supplied and an other end connected to the one end of the transmitting AC coupling element;
a third switching element comprising one end to which the first voltage is supplied and an other end connected to an other end of the transmitting AC coupling element; and
a fourth switching element comprising one end to which the second voltage is supplied and an other end connected to the other end of the transmitting AC coupling element,
the first to fourth switching elements are transistors,
the drive signal generation circuit decreases each impedance of the first and fourth switching elements or the second and third switching elements during the driving period and causes the drive current to flow, and
the drive signal generation circuit decreases, after the driving period, each impedance of the first to fourth switching elements and applies the applied voltage to both of the ends of the transmitting AC coupling element, the applied voltage being a voltage between the first voltage and the second voltage, and then increases each impedance of the first to fourth switching elements and applies another voltage between the first voltage and the second voltage, to both of the ends of the transmitting AC coupling element.

17. The communication system according to claim 16, wherein the receiving AC coupling element is a reception inductor, and
the transmitting AC coupling element is a transmission inductor to be inductively coupled to the reception inductor.

18. The communication system according to claim 16, wherein
the receiving AC coupling element comprises:
a first receiving electrode; and
a second receiving electrode, and
the transmitting AC coupling element comprises:
a first transmitting electrode connected to the one end of the transmitting AC coupling element and to be capacitively coupled to the first receiving electrode;
a second transmitting electrode connected to the other end of the transmitting AC coupling element and to be capacitively coupled to the second receiving electrode; and
a termination resistor connected between the first transmitting electrode and the second transmitting electrode, and
the drive current flows through the termination resistor.

19. The communication system according to claim 16, wherein
the drive circuit comprises:
a fifth impedance element connected between the one end of the transmitting AC coupling element, and a connection node of the other end of the first switching element and the other end of the second switching element; and
a sixth impedance element connected between the other end of the transmitting AC coupling element, and a connection node of the other end of the third switching element and the other end of the fourth switching element.

20. The communication system according to claim 16, wherein
the drive circuit comprises:
a fifth impedance element connected between the other end of the first switching element and the one end of the transmitting AC coupling element;
a sixth impedance element connected between the other end of the second switching element and the one end of the transmitting AC coupling element;
a seventh impedance element connected between the other end of the third switching element and the other end of the transmitting AC coupling element; and
an eighth impedance element connected between the other end of the fourth switching element and the other end of the transmitting AC coupling element.

* * * * *